United States Patent [19]

Rivest

[11] Patent Number: 5,010,686
[45] Date of Patent: Apr. 30, 1991

[54] HYDROPONIC SYSTEM

[76] Inventor: Daniel J. Rivest, P.O. Box 99, Mill Valley, Calif. 94942

[21] Appl. No.: 512,154

[22] Filed: Apr. 20, 1990

[51] Int. Cl.$^5$ .............................................. A01G 31/00
[52] U.S. Cl. ............................................. 47/62; 47/63
[58] Field of Search .................... 47/79, 98.5, 59-63

[56]  References Cited

U.S. PATENT DOCUMENTS

| | | | |
|---|---|---|---|
| 2,909,002 | 10/1959 | Hendry | 47/79 X |
| 3,352,057 | 11/1967 | Ferrand | 47/62 |
| 3,362,106 | 1/1968 | Goldring | 47/79 X |
| 3,603,034 | 9/1971 | Stewart | 47/79 |
| 4,211,034 | 7/1980 | Peisner | 47/59 X |
| 4,255,896 | 3/1981 | Carl | 47/59 X |
| 4,669,217 | 6/1987 | Fiaze | 47/59 X |
| 4,887,386 | 12/1989 | Minshull | 47/79 X |

FOREIGN PATENT DOCUMENTS

| | | | |
|---|---|---|---|
| 691385 | 2/1937 | Fed. Rep. of Germany | 47/48.5 |
| 3635530 | 4/1988 | Fed. Rep. of Germany | 47/79 |

*Primary Examiner*—Henry E. Raduazo
*Assistant Examiner*—Jerrold D. Johnson
*Attorney, Agent, or Firm*—Howard Cohen

[57]  ABSTRACT

A hydroponic system includes a channel-like trough formed of parallel side walls and an orthogonal bottom wall defining an upwardly opening coffer. A pair of oblique walls extend integrally from a medial portion of the bottom wall to respective medial portions of the side walls to define a V-shaped bottom in the interior of the trough. The oblique walls also strengthen the channel structure, and define with the bottom wall and side walls two closed longitudinal flow spaces extending the length of the trough. A pair of end caps are sealed to the ends of the trough, sealing the longitudinal flow spaces and forming a liquid retaining container. A longitudinally extending cover panel is configured to snap-engage the upper edges of the side walls of the trough. The cover panel is provided with a plurality of longitudinally spaced plant holes, and a plurality of plant supporting members are dimensioned to be supported in the plant holes. The plant holes that are not used are capped or plugged, so that there is no evaporation from the coffer, and no light to promote algae growth. A first pair of hose connectors extend through one end cap into the main chamber of the trough, one of the connectors being located at the bottom of the V-shaped trough, and the other located adjacent to the top of the trough. A second pair of hose connectors may be provided, each disposed to pump warm or cool liquid through the longitudinal flow spaces of the trough.

11 Claims, 2 Drawing Sheets

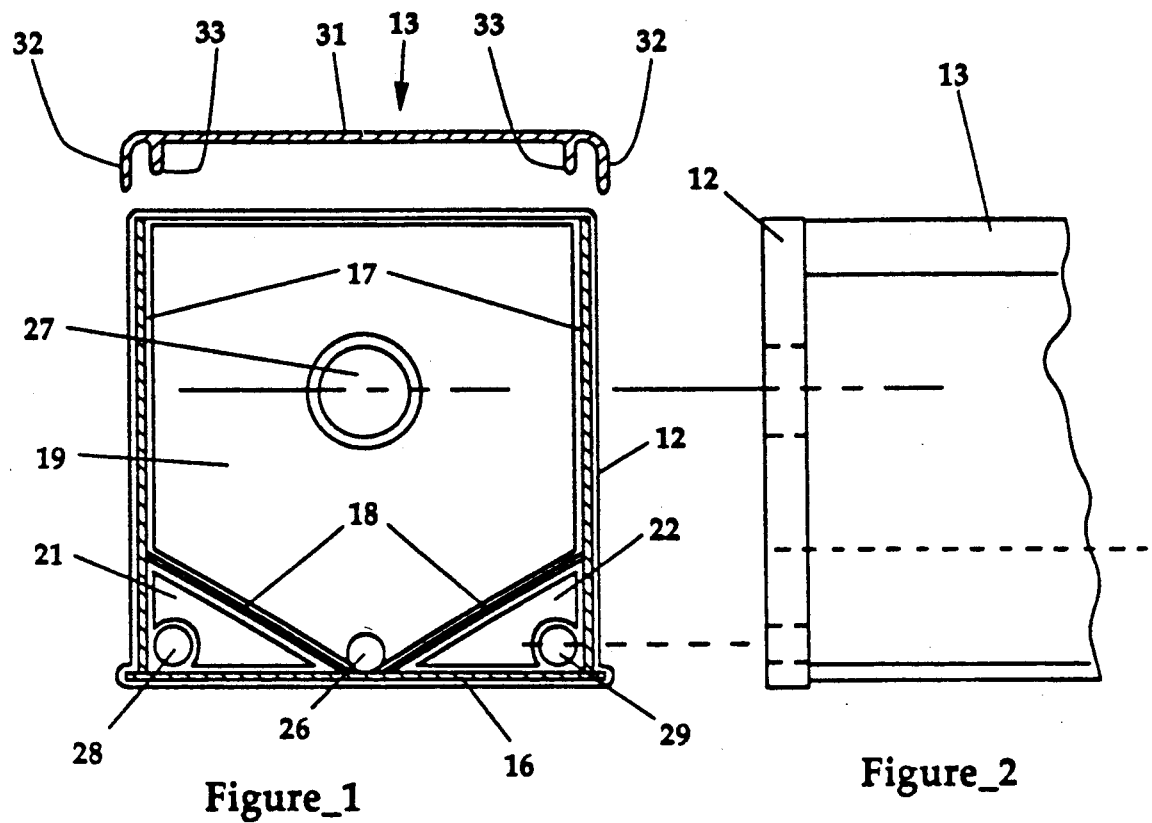
Figure_1
Figure_2
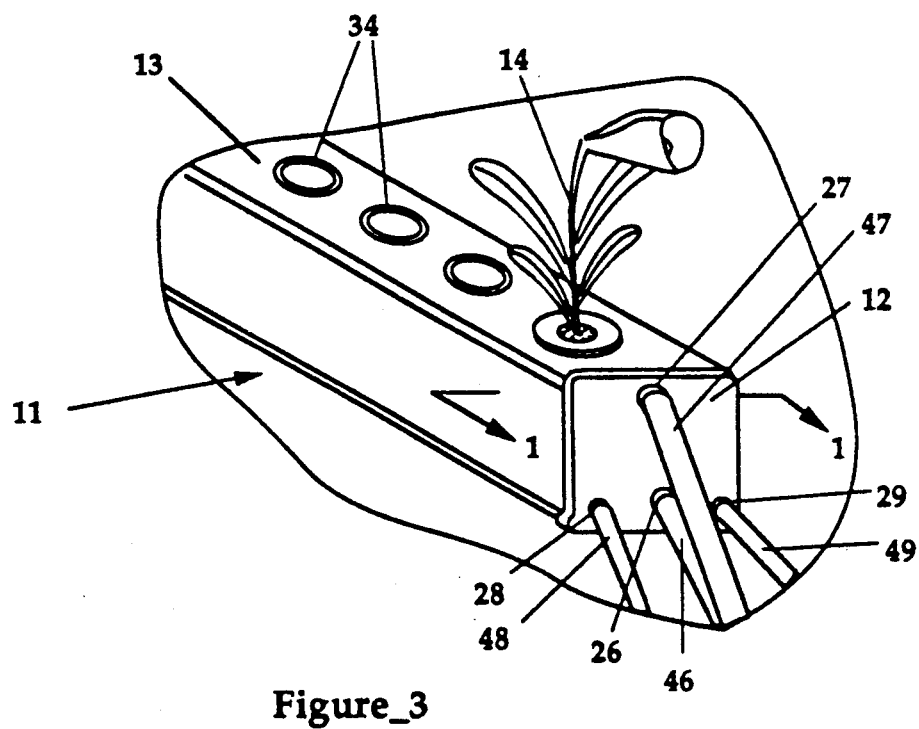
Figure_3

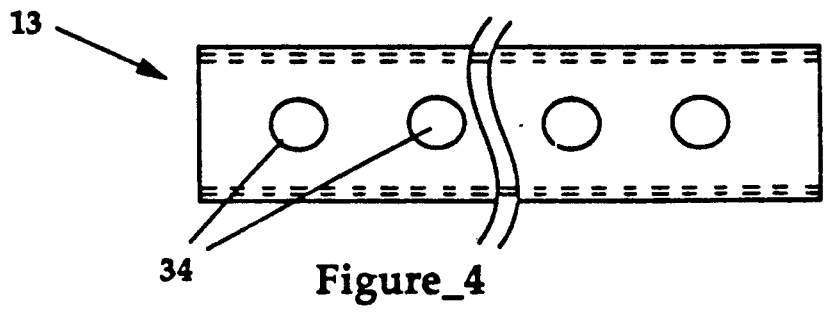
Figure_4
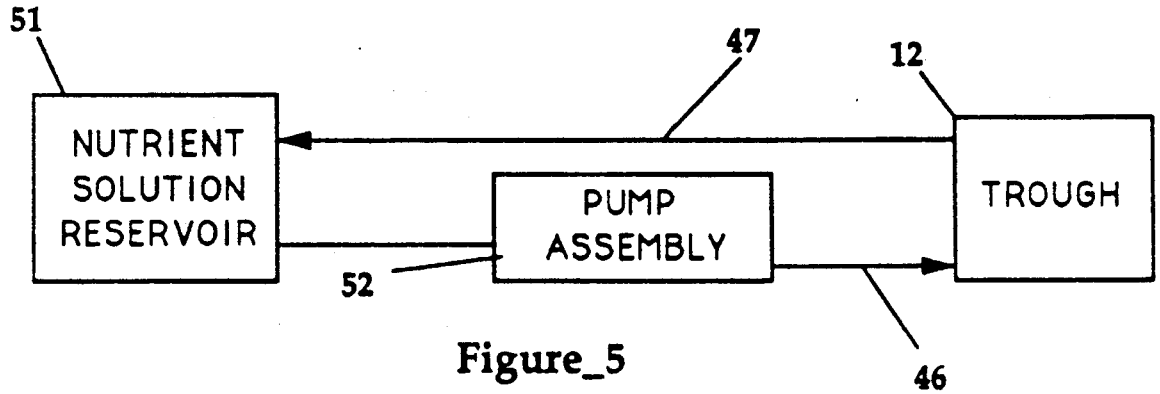
Figure_5
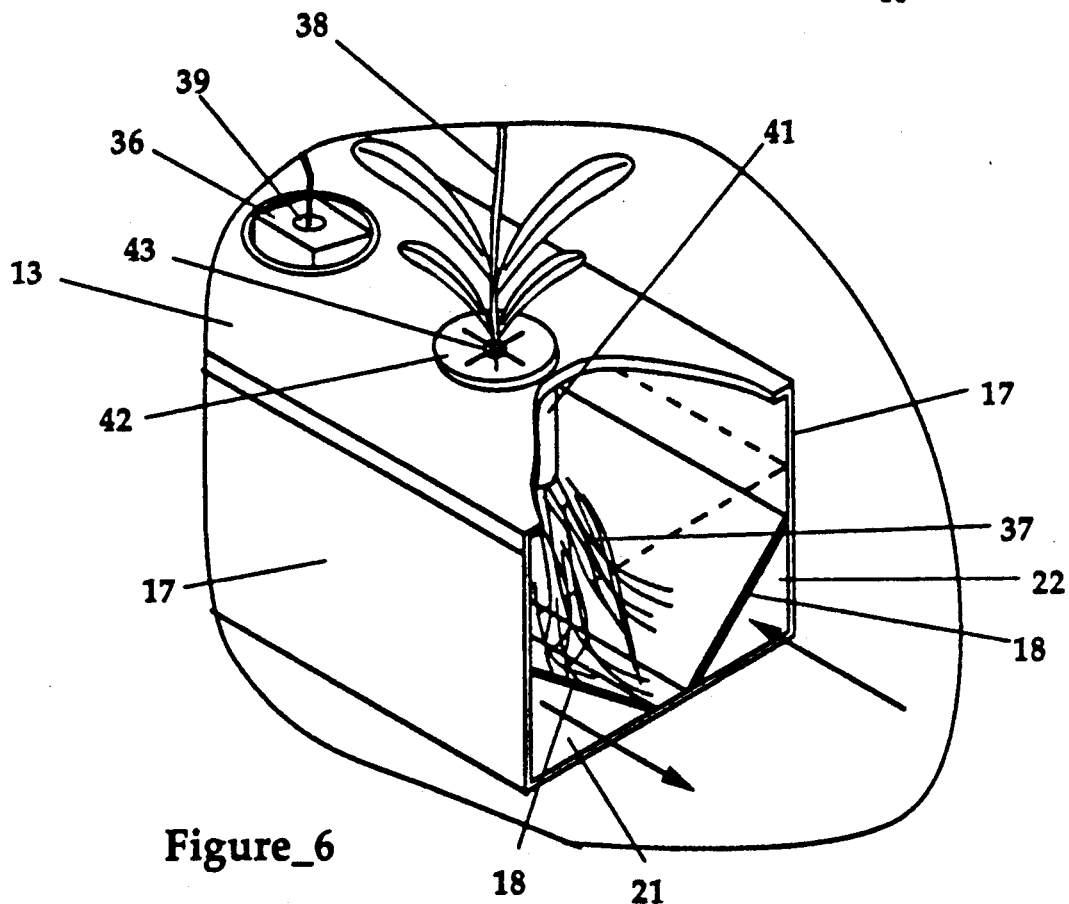
Figure_6

HYDROPONIC SYSTEM

BACKGROUND OF THE INVENTION

Hydroponic systems known in the prior art generally comprise a longitudinally extending trough or coffer having an upward opening, and a pumping system for circulating a nutrient solution through the container. It is also common to employ a growing medium such as sawdust, sand, gravel, exfoliated mineral products, rock wool cubes, or other media that provide structural support for the plant roots and easy circulation of the solution.

The upward opening of most hydroponic systems permits a large amount of evaporation from the system, causing a great deal of water loss. In a greenhouse setting, this has the effect of raising the humidity significantly and requiring the use of dehumidifiers and adding substantially to energy costs. In an outdoor setting the water loss must be compensated, requiring constant water level checking, and testing for nutrient concentration and pH level. Moreover, this waste of large amounts of water negates a major feature of hydroponics; i.e., its inherent conservation of materials and control of growing conditions.

The exposure of the container and its contents to light and sunlight also promotes the growth of algae and the like in the nutrient-rich media. This unwanted growth is parasitic in the system, in that is consumes nutrients intended for productive plant growth. Furthermore, the algae can clog the pumps and filters, causing increased maintenance costs and labor.

The growing media itself also fosters the growth of unwanted and damaging microorganisms, due to the non-sterile nature of the media and the fertile growing conditions. Such microorganisms can attack the plants directly, or can cause indirect damage through toxin release, pH changes in the media, and the like. The use of algicides, fungicides, and anti-bacterial agents adds a great expense to hydroponic operations, and also affect the quality and production of the plants. Also, a growing media that becomes contaminated with destructive agents can be very difficult to clean and restore to productive use.

SUMMARY OF THE PRESENT INVENTION

The present invention generally comprises a hydroponic growing system that overcomes the significant drawbacks in the prior art. The invention provides a growing system that is simpler to set up and use than prior art systems, and that eliminates the use of growing media and minimizes the development of pathogenic organisms. Furthermore, the system is less expensive to produce and operate than prior art systems, and more conservative of water.

The hydroponic system includes a channel-like trough formed of extruded plastic, the trough having parallel side walls and an orthogonal bottom wall defining an upwardly opening coffer. A pair of oblique walls extend integrally from a medial portion of the bottom wall to a respective medial portion of the side walls to define a V-shaped bottom in the interior of the trough. The oblique walls also strengthen the channel structure, and define with the bottom wall and side walls two closed longitudinal flow spaces extending the length of the trough. The trough may extend to any convenient length. A pair of end caps are sealed to the ends of the trough, sealing the longitudinal flow spaces and forming a liquid retaining container.

The system also includes a longitudinally extending cover panel which is configured to snap-engage the upper edges of the side walls of the trough. The cover panel is provided with a plurality of longitudinally spaced plant holes, and a plurality of plant supporting members are dimensioned to be supported in the plant holes. The plant holes that are not used are capped or plugged. The coffer is thus closed to the ambient atmosphere and light, so that there is no evaporation from the coffer, and no light to promote algae growth.

One of the end caps is provided with a first pair of hose connectors extending into the main chamber of the trough, one of the connectors being located at the bottom of the V-shaped trough, and the other located adjacent to the top of the trough. A second pair of hose connectors may be provided, each disposed to establish flow communications with one of the longitudinal flow spaces of the trough. Liquid that is either cool or warm may be pumped through the longitudinal flow spaces, if required, to cool or warm the trough and establish the optimum temperature conditions for the growth of the plants in the system.

The lower one of the first pair of hose connectors is employed to pump nutrient solution periodically into the trough, where it rises and wets the root systems of the plants supported in the plant holes of the cover panel. When the liquid level rises to the upper one of the first pair of hose connectors, the liquid returns to the reservoir, falls through air into the reservior and is oxygenated. After a short time period, the pump shuts off and the liquid drains from the trough. The root systems remain wet, due to the closed cover panel, so that the roots receive sufficient air and oxygen without drying out. These conditions promote the optimum ionic precipitation of the nutrients into the root structures, resulting in maximum plant growth with a minimum root structure.

Alternatively, the nutrient solution may be introduced into the trough as an aerosol by the use of spray emitters spaced along the trough. As another option, an air-solution mixture may be delivered into the trough through an enlarged upper hose connector, and the lower port is used as a drain to the reservoir. In this instance, the aerosol system operates continuously. In all of these nutrient supply techniques, one end of the trough is maintained slightly higher than the outlet port, so that the nutrient solution will drain from the trough.

BRIEF DESCRIPTION OF THE DRAWING

FIG. 1 is a cross-sectional end elevation of the trough assembly of the present invention.

FIG. 2 is a side elevation of the trough assembly of the present invention.

FIG. 3 is a perspective view of the hydroponic trough assembly of the present invention.

FIG. 4 is a plan view of the cover panel of the hydroponic assembly of the present invention.

FIG. 5 is a functional block diagram of the hydroponic system to the present invention.

FIG. 6 is a cutaway perspective view of the hydroponic trough of the present invention, showing a plant supported in the system.

DESCRIPTION OF THE PREFERRED EMBODIMENT

The present invention generally comprises an apparatus for hydroponic culture of plant forms. With regard to FIG. 3, the apparatus generally includes a longitudinally extending, trough-like hydroponic container 11 having end caps 12 and a cover member 13. A plurality of plants 14 are supported in the container 11 and nourished hydroponically for maximum growth and production.

As shown in FIGS. 1-3, the container 11 is formed of a longitudinally extending, rectangular bottom wall 16 and a pair of longitudinally extending, rectangular side walls 17 disposed in parallel, spaced relationship and extending upwardly from opposed edges of the bottom wall. The bottom wall 16 and side walls 17 define a rectangular channel configuration. The trough construction also includes a pair of oblique walls 18 extending upwardly from the midline of the bottom wall to a junction with a respective side wall 17. The walls 18 and side walls 17 define together an upwardly opening coffer having a main chamber 19 with a V-shaped bottom configuration. The walls 18, together with the lower portions of the side walls 17 and the bottom wall 16 define a pair of enclosed chambers 21 and 22. The oblique walls 18 also serve to strengthen the channel construction by forming triangular relationships with the side walls which reinforce the side walls and the channel structure in general.

It should be noted that the trough construction, including the bottom wall, side walls, and oblique walls, is preferably formed integrally from a plastic material such as rigid PVC polymer or the like which includes an ultraviolet stabilizer to prevent degradation of the polymer by incident light. Moreover, the construction may be formed integrally by extrusion to manufacture troughs 11 of any desire length, from short lengths for home use to extremely long troughs for greenhouse and outdoor farming use.

For each segment of trough 11 described above, a pair of end caps 12 are provided to enclose the ends of the trough and render the main chamber 19 liquid retaining and to enclose the lower chambers 21 and 22. Each end cap includes a continuous groove formed in the end surface thereof which is configured to receive the edges of the end portions of the bottom, side, and oblique walls of the channel and to form a seal therewith.

Moreover, at least one of the pair of end caps 12 includes an inlet port 26 adjacent to the lower edge thereof and disposed to be in registration with the lower apex of the V-shaped bottom of the coffer defined by the oblique walls 18. The end cap also includes and outlet port 27 spaced above the inlet port 26 and disposed generally at the maximum desired liquid level planned for the hydroponic system. In addition, the end cap may be provided with a pair of ports 28 and 29 disposed at the opposed lower corners of the end cap and positioned to establish flow commumications with the chambers 21 and 22. The ports 28 and 29 may be used to circulate fluid for heating or cooling of the trough structure through the chambers 21 and 22 to provide the optimum temperature for the root structure growing in the hydroponic system. The heating or cooling effect provided to the roots diffuse into the plants, and often obviate the need for air conditioning and heating in a greenhouse. This feature may be significant in greenhouse use, where a substantial amount of energy is often otherwise expended in heating or cooling the entire structure.

Each of the ports 26-29 may be provided with integrally formed tubing nipples or hose bibs, or these features may be added by the installation of appropriate hardware in the holes provided in the end cap. Hose or tubing members 46-49 are connected to the holes 26-29, respectively, to supply the proper liquid to the respective ports. The holes 26 and 27 facilitate the circulation of nutrient solution through the root structures growing the in trough, as will be explained in the following description.

Another significant feature of the present invention is the provision of the cover panel 13, which comprises a rectangular, longitudinally extending panel having a pair of flanges 32 extending the length of the opposed sides of the panel. The cover also includes a pair of interior flanges 33, each extending longitudinally and spaced inwardly from a respective one of the flanges 32. Each adjacent flange 32 and 33 defines a longitudinal groove disposed to receive the top edge of one of the sidewalls 17 of the trough member 12. The cover panel 13 is dimensioned to extend the length of the trough member to which it is assembled, so that the main chamber 19 of the trough is completely covered. The cover prevents evaporative loss of liquid from the trough, and also prevents exposure of the nutrient solution and roots in the trough to light. As a result, the cover minimizes the growth of algae in the trough and nutrient solution, since algae requires light for photosynthesis, and all water loss in the system is due to transpiration through the plants growing in the system. These characteristics significantly reduce the amount of maintenance of the hydroponic system. Moreover, in outdoor use of the hydroponic system the cover prevents the infiltration of rainwater into the system which would otherwise dilute the nutrient solution and adversely affect plant growth.

With regard to FIGS. 4 and 5, the cover panel also includes a plurality of plant holes 34 spaced longitudinally therealong. The hole spacing may be varied in accordance with the size and space requirements of the plants being grown. For example, lettuce plants may be grown in holes having 6 inch spacing, while tomato plants require 24 inch spacing. The holes 34 may be formed as open holes, or as punch-out blank holes which may be opened as required. Those holes which are open but not used may be covered or plugged to prevent evaporation therethrough. The invention also includes a plurality of plant-supporting members 36 (FIG. 5), each member being dimensioned to be received an supported in one of the plant holes 34 in the cover. Each member 36 is formed of a porous, form retaining, resilient substance such as rock wool, open-cell foam plastic, or the like. A single seed is supported in each member 36, and subjected to wetting by the nutrient solution provided in the trough. As the seed sprouts and grows in the plant-supporting member 36, the material of the member 36 yields to the expanding stem and root structure while continuing to engage the plant and hold it in an upright orientation.

With regard to FIG. 5, the root structure 37 of a plant supported in a plant-supporting member 36 extends downwardly toward the V-shaped bottom of the trough, seeking the nutrients of the solution that is circulated periodically through the trough. The member 36 eliminates the use of a growing medium such as soil, gravel, sawdust, or vermiculite, and thus eliminates a significant source of system maintenace and contamination. The plant supporting member 36 may comprise a cylindrical or rectangular solid formed of rock wool or the like and provided with a narrow vertical hole extending 39 therethrough. The vertical hole 39 encourages the growing plant stem to extend through the hole, with the roots forming below the rectangular solid and the leaves, flowers, and fruit forming above the member 36.

As an alternative to the plant-supporting member 36, the user of the system may employ a cylindrical container 41 such as a plastic film cannister commonly known in the photographic arts. The film cannister is provided with a hole drilled or punched in the bottom thereof, and a rectangular member 36 may be supported in the film cannister placed in the hole 34, with a small portion of the member 36 extending through the bottom of the film cannister. If any particular hole 34 is not used to grow a plant, the film cannister is placed in the hole, and the snap top 42 of the cannister is secured to the cannister to seal the hole 34 and prevent entry of light or evaporation of liquid. As a further alternative, an empty film cannister with a hole drilled in the bottom may be placed in the hole 34, and the film cannister top is provided with a central hole and a plurality of cuts 43 radiate outwardly therefrom. The stem 38 of a plant is placed through the hole in the top, and the roots are allowed to grow through the hole in the bottom of the cannister to seek the nutrients circulated in the trough. The star-shaped cuts in the top permit radial growth of the stem without constriction, while the plant is provided with sufficient support. In all these alternative growing techniques, the film cannister and tops are reusable indenfinitely.

With regard to FIG. 5, the hydroponic system of hte present invention may include a nutrient pumping system that provides periodic and frequent replenishment of the nutrient solution in the trough 12. The pumping system includes a nutient solution reservoir 51 which is connected to supply a pump assembly 52. The pump assembly 52 includes a timer that actuates the pump portion thereof to operate several times per day at spaced intervals. The pump assembly is connected through hose 46 to port 26 to deliver nutrient solution to the trough. When the trough fills with solution to a level that causes solution of flow out of the port 27 into hose 47, the liquid returns to the reservoir, falls through air into the reservoir and is oxygenated. After a short time period, the pump shuts off and the liquid drains from the trough. This process requires only a few minutes, and may be repeated on the order of 5 or 6 times per day. The root structures remain wetted, and evaporation and drying are prevented by the presence of the cover member. The roots are thus exposed to air for a substantial portion of time, permitting maximum access to oxygen and encouraging a great amount of ionic precipitation of the nutrients into the roots.

Alternatively, the trough may be provided with spray emitters (such as those used in sport irrigation systems) spaced therein and extending from a supply tube through the bottom wall of the trough, with the hole 26 acting as a solution drain return to the reservoir. The spray emitters generate an aerosol mist of nutrient to create the optimum conditions of oxygen exposure and nutrient availability to the roots. The system timer may actuate the pump assembly to operate periodically, as described above. In both nutrient delivery arrangements, a separate pump and heater (or cooler) may be connected to the hoses 48 and 49 to deliver heat or remove heat from the trough structure. Such devices are well known in the prior art, and are commerically available.

What is claimed is:

1. A hydroponic system, including a channel-like trough having opposed side walls and end walls and a closed bottom defining an upwardly opening coffer, a top cover secured to the trough and dimensioned to close the upwardly opening coffer, a plurality of holes formed in said top cover, a plurality of plant supporting members, each secured in one of said holes and disposed to support a plant with the plant roots extending into said trough and the stem entending upwardly from said top cover, said closed bottom of said trough including a pair of oblique walls joined longitudinally to form a V-shaped bottom extending longitudinally in said trough, a bottom wall extending generally orthogonally between said side walls, said bottom wall, side walls and oblique walls forming a pair of closed chambers extending longitudinally along said trough, each of said oblique walls including an upper edge joined to a respective one of said side walls along a medial line extending longitudinally therealong, each of said oblique walls including a lower edge joined to said bottom wall along a medial line extending longitudinally therealong.

2. The hydroponic system of claim 1, wherein said end walls comprise a pair of end caps, each of said end cap including means for forming a liquid seal with said side walls, bottom wall, and oblique walls.

3. The hydroponic system of claim 2, wherein at least one of said end caps includes in inlet port extending therethrough and disposed to establish flow communications with said coffer.

4. The hydroponic system of claim 3, wherein said inlet port is disposed adjacent to the apex of said V-shaped bottom.

5. The hydroponic system of claim 4, wherein at least one of said end caps includes an outlet port extending therethrough.

6. The hydroponic system of claim 5, wherein said outlet port is spaced above said inlet port.

7. The hydroponic system of claim 6, further including a reservoir of plant nutrient solution, pump means connected between said reservoir and said inlet port to pump said nutrient solution into said trough, and a fluid return line connected between said outlet port and said fluid reservoir.

8. The hydroponic system of claim 7, further including timer means for actuating said pump means briefly and periodically each day, and for stopping said pump means and draining said trough whenever said pump means is stopped.

9. The hydroponic system of claim 4, wherein one of said end caps includes a pair of liquid circulation ports, each of said liquid circulation ports extending to one of said closed chambers.

10. The hydroponic system of claim 9, further including means for circulating heating or cooling fluid through said liquid circulating ports and said closed chambers.

11. The hydroponic system of claim 1, wherein said plurality of plant supporting members include a plurality of cells, each dimensioned to be supported in one of said holes.

* * * * *